H. DISSTON.
MACHINE FOR GRINDING SAWS.
No. 29,680. Patented Aug. 21, 1860.
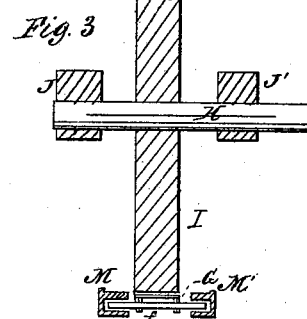
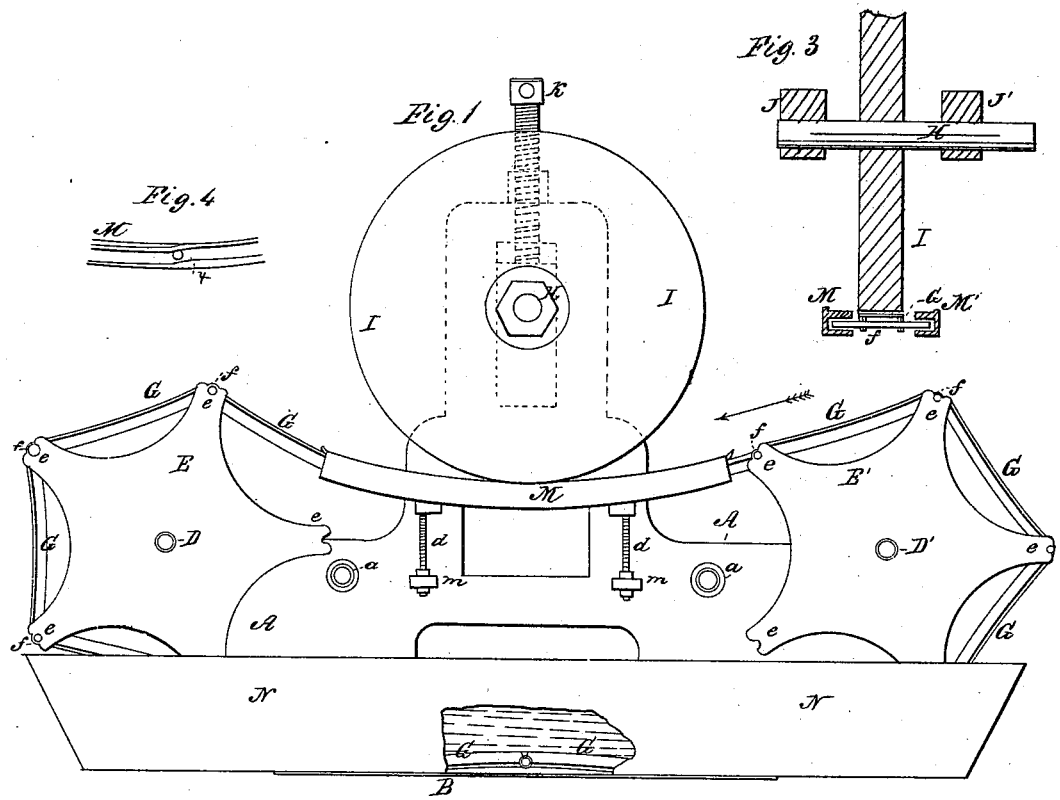
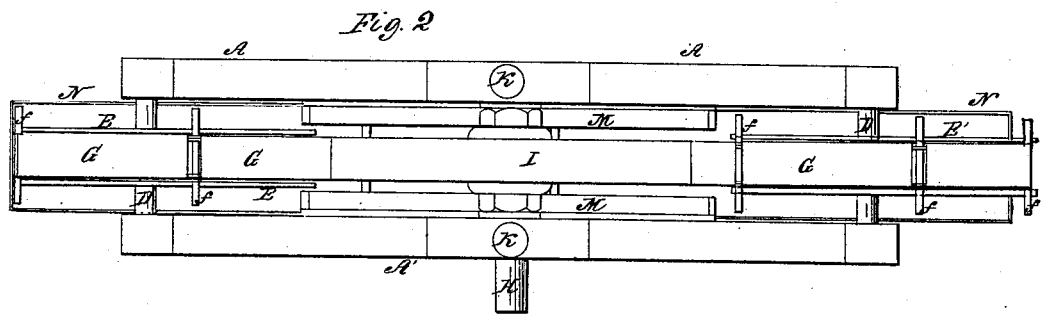
Witnesses:
Henry Howson
Charles E Foster
Inventor:
Henry Disston

UNITED STATES PATENT OFFICE.

HENRY DISSTON, OF PHILADELPHIA, PENNSYLVANIA.

MACHINE FOR GRINDING SAW-BLADES.

Specification of Letters Patent No. 29,680, dated August 21, 1860.

*To all whom it may concern:*

Be it known that I, HENRY DISSTON, of the city of Philadelphia, State of Pennsylvania, have invented a new and Improved Machine for Grinding Saws; and I do hereby declare the following to be a full, clear, and exact description of the same, reference being had to the accompanying drawing and to the letters of reference marked thereon.

My invention consists in grinding saw blades by placing them in concave or curved plates and causing the plates to traverse in such a direction in respect to a revolving grindstone that the latter shall bend the blades into the concavity of the plates during or prior to the operation of grinding the blades, thereby imparting to the surfaces of the latter that uniformity which cannot be attained by grinding the blades when they are on a flat surface; also in combining an endless chain of concave plates with a revolving grindstone substantially in the manner described hereafter so that a succession of saw blades may be ground with great rapidity; also in combining the said endless chain of plates with certain adjustable curved guides described hereafter so that the plates may be retained in a rigid state during the action of the grindstone on the blades; also in a certain device described hereafter, or its equivalent, by means of which the saw blades may be ground to a taper form.

In order to enable others skilled in the art to make and use my invention, I will now proceed to describe its construction and operation.

On reference to the accompanying drawing, which forms a part of this specification, Figure 1, is a side view of my machine for grinding saws, one of the frames being removed. Fig. 2, is a plan view. Fig. 3, a transverse section of a detached portion of the machine. Fig. 4, a detached view showing the inside of a portion of one of the guides.

Similar letters refer to similar parts throughout the several views.

The framework of the machine consists of two standards A and A' connected together by any number of cross bars $a\ a$, and secured to a suitable base B. In the opposite frames turn the two shafts D and D' to the former of which is secured a wheel E, and to the latter a similar wheel E', each wheel consisting of two plates riveted or otherwise secured together and having any suitable number of projections $e$ with indentations at their end, for receiving the coupling pins $f$ by means of which the plates G are connected together so as to form an endless chain. Each plate is of a length and width sufficient to receive one saw blade, which is laid on the plate and retained thereon by any suitable arrangement of projections or pins.

In a vertical line situated midway, or thereabout, between the shafts D and D' is the spindle H carrying a grindstone I, the spindle turning in blocks J and J' one of which is adapted to one standard A and the other to the opposite standard A' of the frame, the blocks being rendered adjustable vertically by means of screws K K, which are independent of each other, so that the grindstone may be readily raised more on one side than the other for a purpose described hereafter.

M and M are two curved guides situated below the grindstone one on each side of the latter, one guide being attached to the inside of one standard and the other to the inside of the opposite standard and both guides being rendered adjustable vertically by means of screws $d,\ d$, the upper ends of which are secured to the guides, the lower ends passing through lugs $m$, $m$, on the standards, to which the screws are confined by suitable nuts. The guides M, and M' are curved to suit the curve of the plates G, the pins $f$, which serve to couple these plates together being of such a length that one end of each pin shall pass into one guide and the other end into the opposite guide as the endless chain of plates traverses beneath the grindstone. One of the guides instead of presenting a uniform curve has at one point a gradual upward inclination, as seen at $x$ in Fig. 4, so that one corner of each plate in succession will be tilted up as the coupling pin passes this inclination. The object of this arrangement will be fully explained hereafter.

A trough N containing a supply of water is secured to the base B of the machine, and within this trough traverses the endless chain of plates, so that the latter may be thoroughly washed and freed from all accumulations of sand and other refuse.

The grindstone having been adjusted so that it may have the desired amount of bearing on the saw-blades, and the curved guides having also been properly adjusted by means of the above mentioned set screws $d\ d$, the endless chain of plates is caused to traverse slowly in the direction of the arrow by turning the shaft D and a rapid rotary motion is imparted to the grindstone by any suitable driving apparatus. An attendant, situated at the front end of the machine places a saw blade on the concave surface of each plate preparatory to its traverse beneath the grindstone. As the coupling pins $f$ of the endless chain pass through the guides, the plates are maintained in a rigid state and are incapable of yielding to the action of the stone which presses the saw-blade down to the concave surface of the plate and removes from each blade so much of the surface as may be determined on by the adjustment of the stone in respect to the position of the guides. After passing the stone the blades are allowed to fall to the ground or they may be conveyed by any suitable means to the front of the machine to be again laid on the plates and subjected to the action of the stone as before should any regrinding of the blades be deemed necessary.

In grinding saw blades which have to be of a uniform thickness throughout the guides have a uniform curve, but when the blades have to be ground thinner at the back near the point of the blade than at other parts of the same (a plan adopted in the better class of hand saws) one of the guides is furnished with an upward inclination, as previously explained in reference to Fig. 4. It will be evident without further description that this inclination may be so formed and so situated as to tilt each plate in succession to the extent desired for imparting any required taper to the saw blade.

In grinding saw blades by placing them on flat surfaces and in this condition submitting them to the action of a grindstone the surface of a saw invariably presents that waved appearance which is a certain indication of its irregularity. This is not the case when the blade is bent during the operation of grinding, hence the importance of making the upper surfaces of the plates G, of the concave form represented and described.

In using a grindstone for operating on saw blades it has been found necessary to make it slightly rounding transversely on the grinding surface, and to maintain the edge in this condition. In order to do this in the present instance the screws K are arranged to operate independently of each other so that the stone may be tilted from one side to the other alternately thereby preserving its rounded grinding surface. Although no mechanism for producing this lateral movement or vibration of the stone other than by the manipulation of the screws K, is illustrated in the drawing, it will be evident that it may be readily effected by the moving parts of the machine and that appliances may be used for tilting the stone from side to side, and thereby imparting any desired variation in thickness to the saw blade without the necessity of tilting the corners of the plates G. It will also be evident that the plates G may be arranged to move over a system of rollers in place of the guides M and M′ and that the framework and other parts of the machine may be modified without departing from the main features of my invention.

Without confining myself therefore to the precise form and construction of the parts herein described, I claim as my invention and desire to secure by Letters Patent—

1. Grinding saw blades by placing them on concave or curved plates and causing the plates to traverse in such a direction in respect to a revolving grindstone that the latter shall bend the blades into the concavity of the plates during or prior to the operation of grinding for the purpose specified.

2. Combining an endless chain of concave plates G with a revolving grindstone substantially in the manner herein set forth so that a continuous succession of blades may be submitted to the action of the stone as specified.

3. The combination with the endless chain of plates G, the adjustable guides M and M′ or their equivalents the whole being arranged and operating substantially as and for the purpose herein set forth.

4. Causing the plates G as they pass beneath the grindstone to be tilted by means of an inclination in one of the guides or any equivalent device.

In testimony whereof, I have signed my name to this specification, in the presence of two subscribing witnesses.

HENRY DISSTON.

Witnesses:
 HENRY HOWSON,
 CHARLES E. FOSTER.